(12) United States Patent
Carter et al.

(10) Patent No.: US 8,364,889 B2
(45) Date of Patent: Jan. 29, 2013

(54) DYNAMIC ROW-WIDTH MEMORY

(75) Inventors: John B. Carter, Austin, TX (US);
Karthick Rajamani, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 12/789,641

(22) Filed: May 28, 2010

(65) Prior Publication Data

US 2011/0296118 A1  Dec. 1, 2011

(51) Int. Cl.
*G06F 12/00* (2006.01)
(52) U.S. Cl. ........................................ 711/105
(58) Field of Classification Search ............... None
See application file for complete search history.

(56) References Cited

U.S. PATENT DOCUMENTS

| | | | |
|---|---|---|---|
| 5,572,692 A * | 11/1996 | Murdoch et al. | 711/5 |
| 6,282,604 B1 * | 8/2001 | May | 711/5 |
| 6,741,506 B2 | 5/2004 | Han | |
| 7,043,599 B1 * | 5/2006 | Ware et al. | 711/106 |
| 7,460,428 B2 | 12/2008 | Joo et al. | |
| 7,549,034 B2 | 6/2009 | Foster, Sr. et al. | |
| 7,551,505 B1 | 6/2009 | Daniel | |
| 7,596,038 B2 | 9/2009 | Kim et al. | |
| 2006/0095803 A1 | 5/2006 | Lin | |

FOREIGN PATENT DOCUMENTS

DE  10319158 A1  11/2004

OTHER PUBLICATIONS

Moshnyaga, Vasily G., "Reducing Energy Dissipation of Frame Memory by Adaptive Bit-Width Compression", IEEE Transactions on Circuits and Systems for Video Technology, vol. 12, No. 8, Aug. 2002, pp. 713-718.

* cited by examiner

*Primary Examiner* — Brian Peugh
(74) *Attorney, Agent, or Firm* — Stephen J. Walder, Jr.; Eustus D. Nelson

(57) ABSTRACT

A mechanism is provided for dynamic row-width memory. The memory adapts row width to usage based on memory controller and memory management system software control. The mechanism uses an organization and control of memory array access logic. The memory controller may receive an explicit command using existing column address lines or using a command line into the memory controller. In a first option, the memory controller receives a row width and disables the unused columns and turns off the unused sense amps. In a second option, the memory controller receives a row width and adjusts row count, keeping the number of active cells constant. In a third option, the memory controller receives a row width and adjusts a number of banks.

20 Claims, 6 Drawing Sheets

FIG. 4B
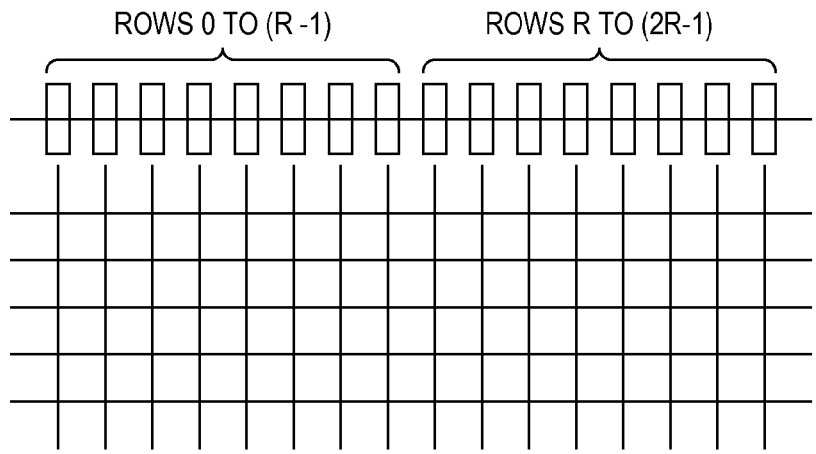
FIG. 4C
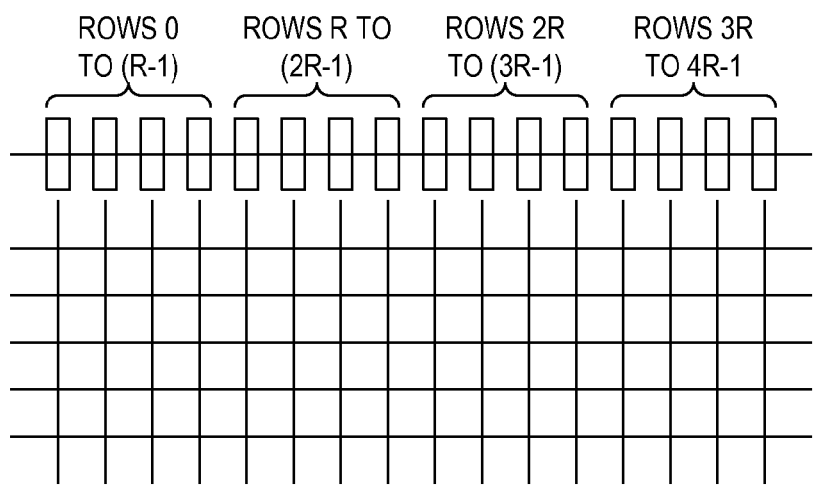
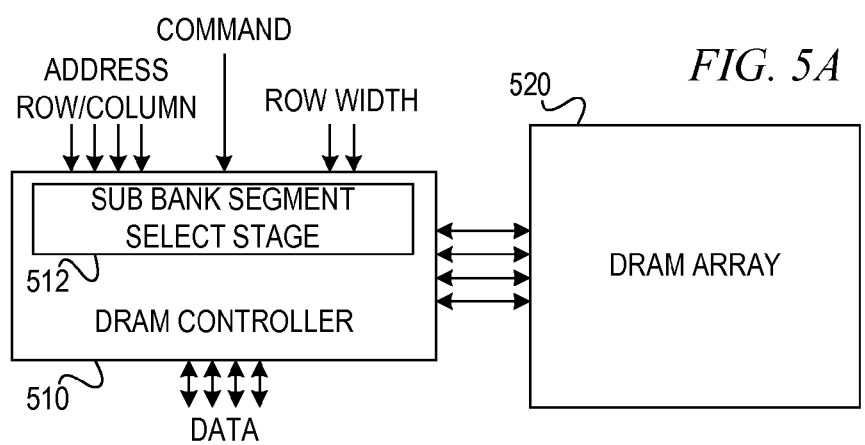
FIG. 5A

*FIG. 5B*
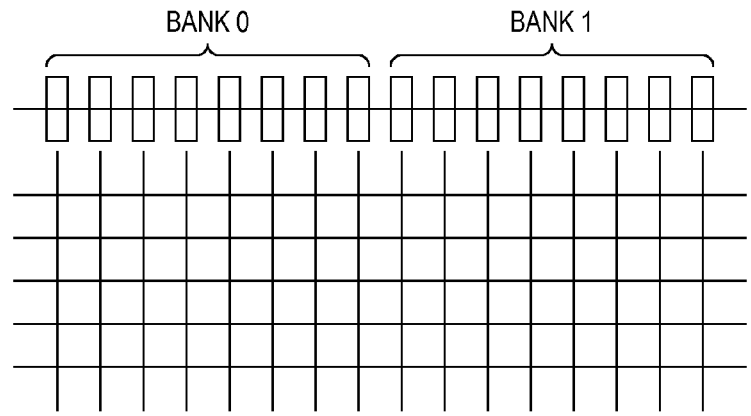
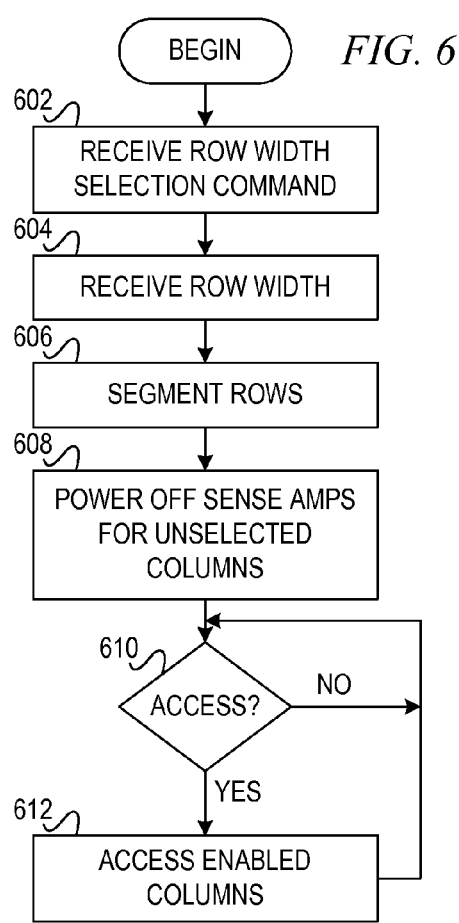
*FIG. 6*
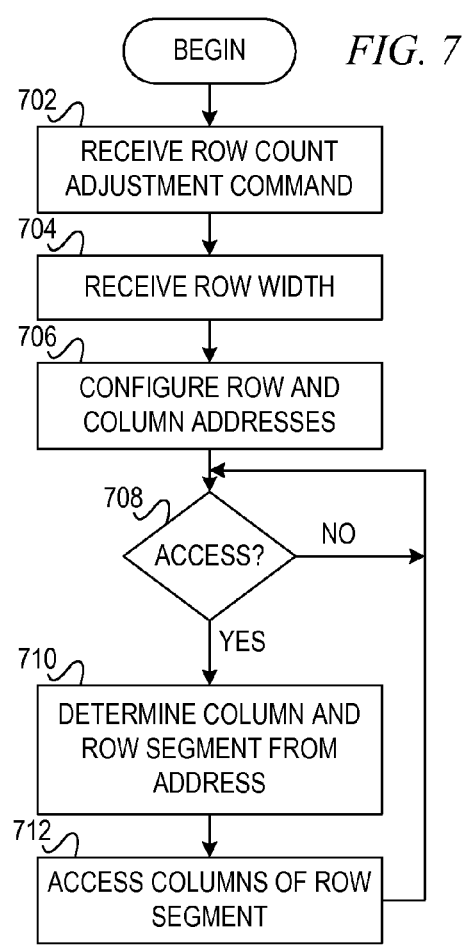
*FIG. 7*

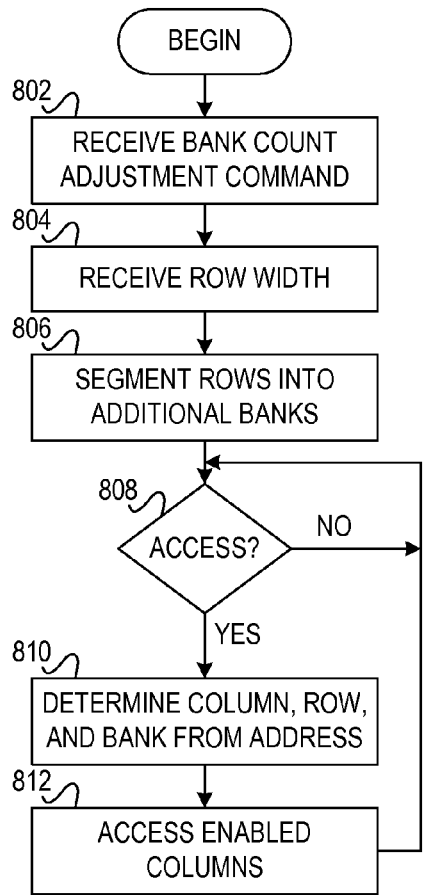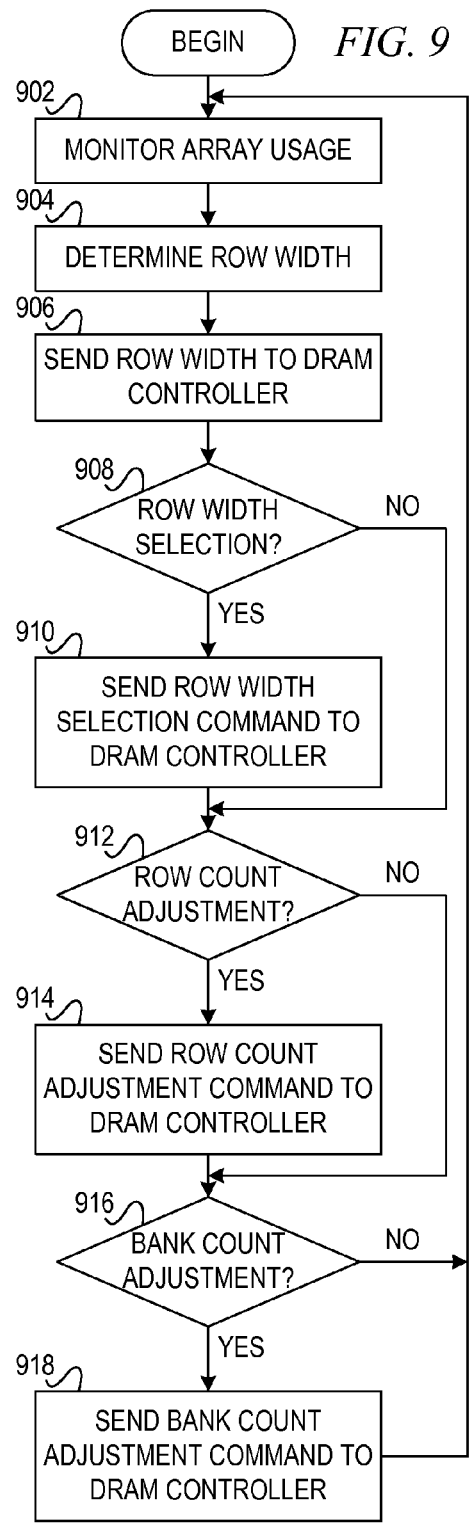

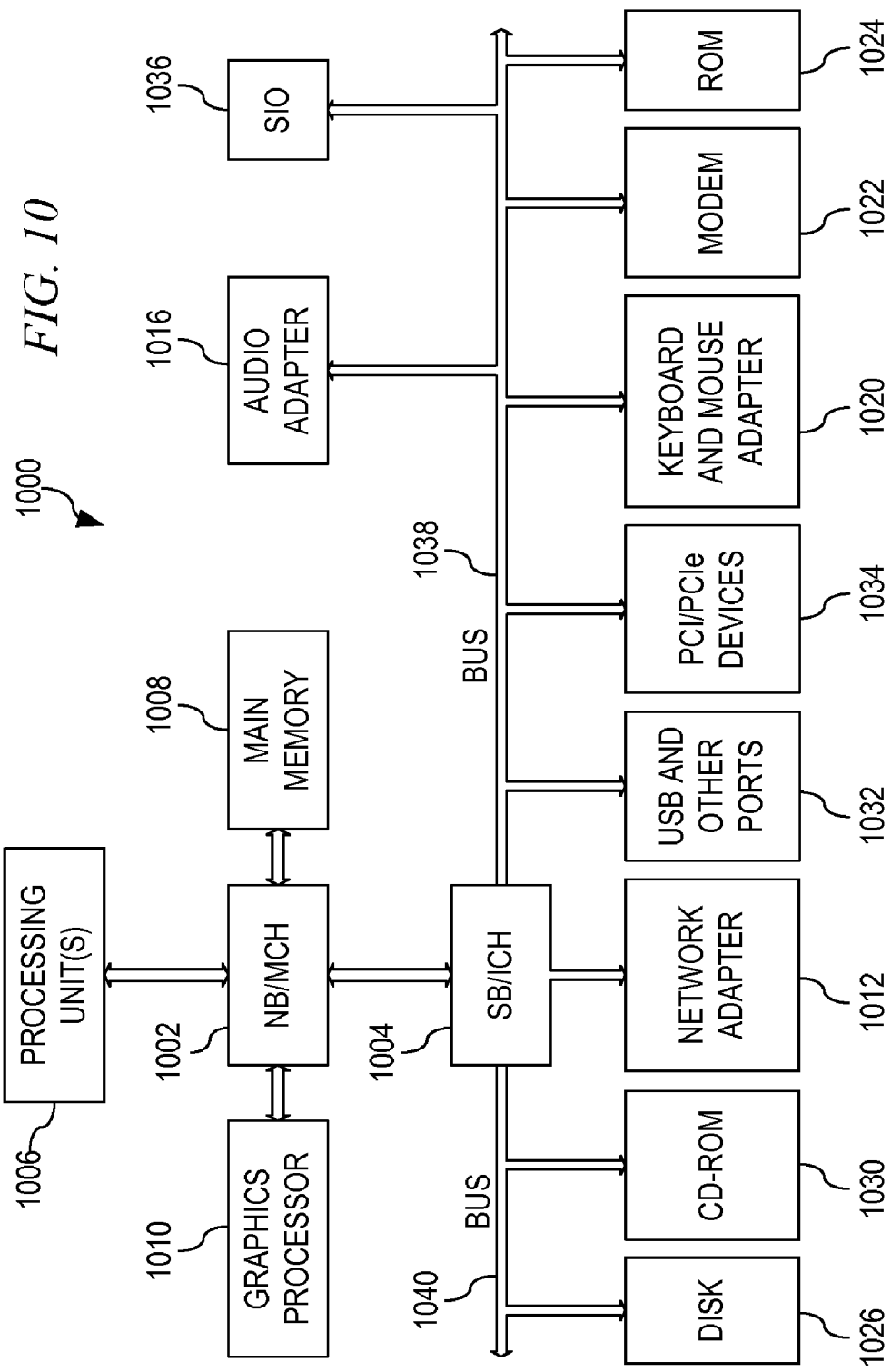

DYNAMIC ROW-WIDTH MEMORY

BACKGROUND

The present application relates generally to an improved data processing apparatus and method and more specifically to mechanisms for dynamic row-width memory.

Dynamic random access memory (DRAM) devices may employ wide row width arrays and sense logic. For example, a typical 1 GB DRAM device may have eight banks, each with 8192 columns and 16,384 rows. There are significant energy inefficiencies associated with this memory organization for typical usage scenarios, because typically only a fraction of the bits transferred from the DRAM array to the sense logic are sent out of the device before the row is written back to the array. The memory must power the sense amps for the entire row, even though the server may only read data from a small number of columns. Also, the memory must pre-c (write back) the entire row on a new row select.

Reads from DRAM cells are destructive (the charge in the cell that represents a 0 or 1 is drained from the cell into the sense amps as part of the read operation). Thus, the values in the sense amps must be written back before that row can be "closed." This write back is referred to as a "pre-charge" operation.

In open page mode, the memory may wait for a next access to determine whether to pre-charge (write back) the data stored in the sense amps to its associated portion of the DRAM array (cells). If the next access is to the same row, then the data will already be in the sense amps and can be returned immediately. If the next access is to a different row, then there is added latency as the memory stores the data in the sense amps back to the storage array, and then loads the data for the newly requested row into the sense amps before returning the requested data.

In burst mode, the memory transfers a length of bits from the same row. However, even in burst mode, the memory typically transfers far fewer than 8192 bits.

SUMMARY

In one illustrative embodiment, a method, in a data processing system, is provided for dynamic row width selection in a memory array. The method comprises receiving, by a memory controller, a row width selection. The method further comprises disabling, by the memory controller, one or more column address lines. The method further comprises disabling, by the memory controller, a portion of a row buffer for each row of the memory array.

In another illustrative embodiment, a method, in a data processing system, is provided for dynamic row width selection in a memory array. The method comprises monitoring usage of a memory array. The method further comprises determining a row width based on the usage of the memory array. The method further comprises sending a row width selection to a memory controller to select a row width for the memory array.

In another illustrative embodiment, a memory device is provided, comprising a memory array and a memory controller. The memory controller is configured to receive a row width selection, disable one or more column address lines, and disable a portion of a row buffer for each row of the memory array.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 4B and 4C illustrate example DRAM arrays with row count adjustment in accordance with an illustrative embodiment;

FIG. 5A is a block diagram of a DRAM device with dynamic bank count adjustment in accordance with an illustrative embodiment;

FIG. 5B illustrates an example DRAM array with bank count adjustment in accordance with an illustrative embodiment;

FIG. 6 is a flowchart illustrating operation of a memory controller with dynamic row width selection in accordance with an illustrative embodiment;

FIG. 7 is a flowchart illustrating operation of a memory controller with dynamic row count adjustment in accordance with an illustrative embodiment;

FIG. 8 is a flowchart illustrating operation of a memory controller with dynamic bank count adjustment in accordance with an illustrative embodiment;

FIG. 9 is a flowchart illustrating operation of a mechanism for configuring a memory device with dynamic row width selection in accordance with an illustrative embodiment; and FIG. 10 is a block diagram of an example data processing system in which aspects of the illustrative embodiments may be implemented.

DETAILED DESCRIPTION

The illustrative embodiments provide a mechanism for dynamic row-width memory. The memory adapts row width to usage based on memory controller and memory management system software control. The mechanism provides memory array control and access logic to enable the DRAM row width to be changed. The desired row width can be communicated to the DRAM in a number of ways. In a first option, a new DRAM command can be used to communicate the desired row width. In a second option, an existing DRAM command can be used with special values to the column address lines to indicate the desired row width. In a third option, additional input lines can be added to an existing DRAM command to specify the desired row width. In a fourth option, select column address lines can be tri-stated to implicitly encode the desired row width. In digital electronics, tri-state logic allows output ports to assume a high impedance state in addition to the fundamental 0 and 1 states.

Upon receiving an external command that specifies a desired row width, the DRAM device can reorganize itself in a number of ways. In a first option, the DRAM device receives a row width and disables the unused columns and turns off the unused sense amps. In a second option, the DRAM device receives a row width and adjusts the row count, keeping the number of active cells constant, as will be described in further detail below. In a third option, the DRAM device receives a row width and adjusts a number of banks, as will be described in further detail below.

Figure 1:
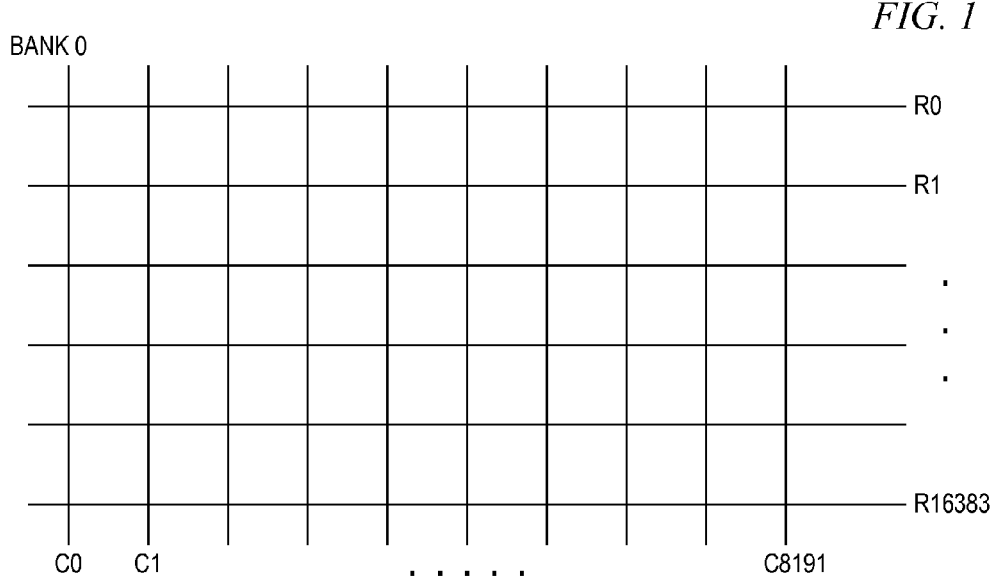
FIG. 1 illustrates an example memory organization in which aspects of the illustrative embodiments may be implemented.

FIG. 1 illustrates an example memory organization in which aspects of the illustrative embodiments may be implemented. The example illustrates dynamic random access memory (DRAM) cells organized in one bank, having rows and columns. As an example, a typical 1 GB DDR3 random access memory (RAM) device may include 8 banks, 8192 columns, and 16,384 rows. The DRAM has a memory cell, which stores one bit, at each intersection of a row and a column.

Figure 2:
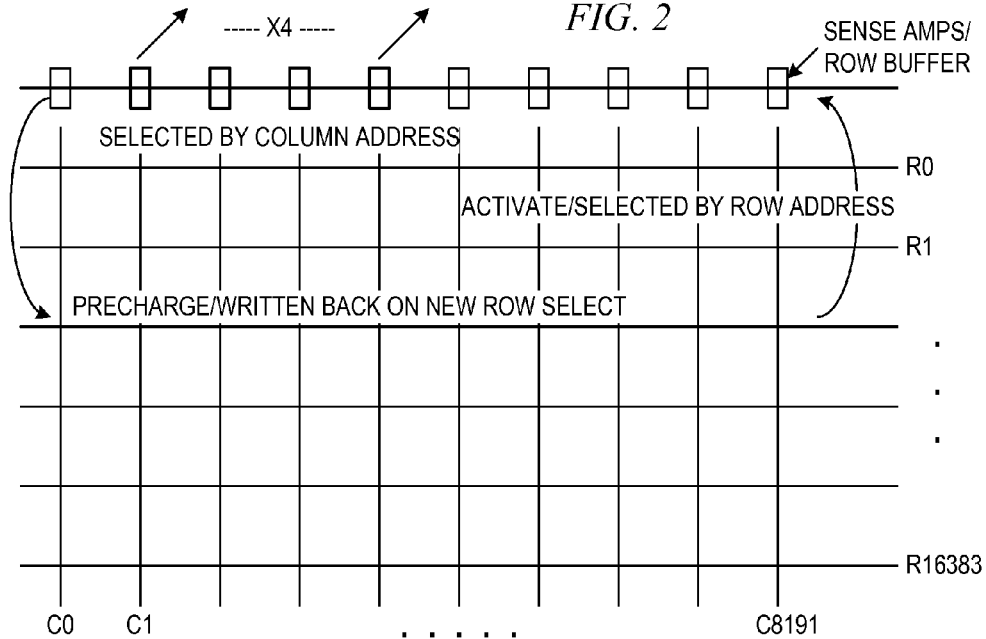
FIG. 2 illustrates a read from an example memory organization in which aspects of the illustrative embodiments may be implemented.

FIG. 2 illustrates a read from an example memory organization in which aspects of the illustrative embodiments may be implemented. The memory pre-charges the row on a new row select and moves data from the cells in that row to the sense amps/row buffer. Because the row width is 8192 in this example, the memory drives 8192 sense amps. Then, in the depicted example, the memory uses the column address to select four bits from the sense amps/row buffer and drives these four bits to four external pins. When the memory moves the data from the cells in the addressed row to the sense amps, the memory then writes the data back to the row. Some time after driving the requested bits to the external pins, the memory writes the data back from the sense amp to the row from which it was loaded, i.e., pre-charges the row. Exactly when it does the pre-charge is dependent on what mode it is operating in, e.g., so-called "open row" versus "auto-close." The DRAM must perform the pre-charge before it can return data from another row in the same bank, but if it thinks (or is told) that the next accesses will be the same row, it can profitably defer the pre-charge.

Due to the physical constraint of physical pins, in this case four pins, for each DRAM read operation, the memory actually reads from a small subset of the entire row width, in general, DDR (double data rate) DRAM is typically available in so-called x4, x8, or x16 formats, which correspond to exporting 4, 8, or 16 bits of data per cycle (i.e., that many pins). To get an entire cache line (e.g., 32-128 bytes), the memory device combines multiple individual DRAM chips in to a DIMM (dual inline memory module) package. The DRAM capacity, leakage, and refresh power, the address bit sequencing, and activate/pre-charge power are all impacted by the large row width. A significant amount of device power is wasted in writing cells to sense amps and back without using the data. The activate/pre-charge power can be a dominant fraction of the power used.

The activate/pre-charge mechanism was introduced to reduce the latency of access to cells in different rows. However, modern server systems employ heavy address interleaving preferring concurrent accesses on multiple devices to overcome column address select (CAS) to column address select latency and to accommodate non-sequential address accesses. In non-sequential address accesses, other DRAM device latencies come into play. Consequently, activate/pre-charge power continues to be a dominant component of DRAM power.

In accordance with the illustrative embodiments, a mechanism is provided for dynamic row-width memory. In one illustrative embodiment, a component, such as an application, operating system, or virtualization component, for example, may select DRAM row width (active columns) at run time. In another illustrative embodiment, the memory controller or other hardware device may select the DRAM row width (active columns) at run time. The DRAM controller may dynamically synch with the DRAM array to specify the desired row width. Whenever a DRAM device resizes memory, the device may first evacuate (flush out) the memory or copy affected data to other portions of memory to avoid losing the data.

Figure 3A:
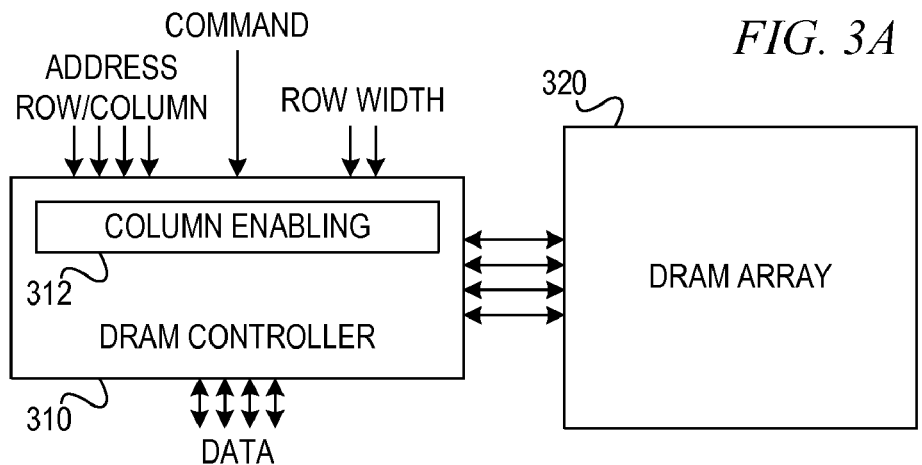
FIG. 3A is a block diagram of a DRAM device with dynamic row width selection in accordance with an illustrative embodiment.

FIG. 3A is a block diagram of a DRAM device with dynamic row width selection in accordance with an illustrative embodiment. The DRAM controller 310 may receive an explicit command to latch a row width using existing column address lines and/or a new command. DRAM controller 310 also has additional input lines to receive a row width, DRAM controller 310 comprises a column enabling component 312 to selectively enable column address lines. The enabling of column address lines may be an implicit indicator for row width selection in DRAM array 320.

DRAM controller 310 receives a command to select a dynamic row through a combination of row and column addresses, an explicit command, and/or row width input lines. Column enabling component 312 then may disable one or more column address lines. As an example, for a DRAM with 8192 columns, the column address may be 13 bits ($2^{13}$=8192). Thus, disabling one bit of the column address would result in a 12-bit address that results in 4096 columns, dividing the number of columns in half DRAM controller 310 also disables the sense amps for the unused columns.

Figure 3B:
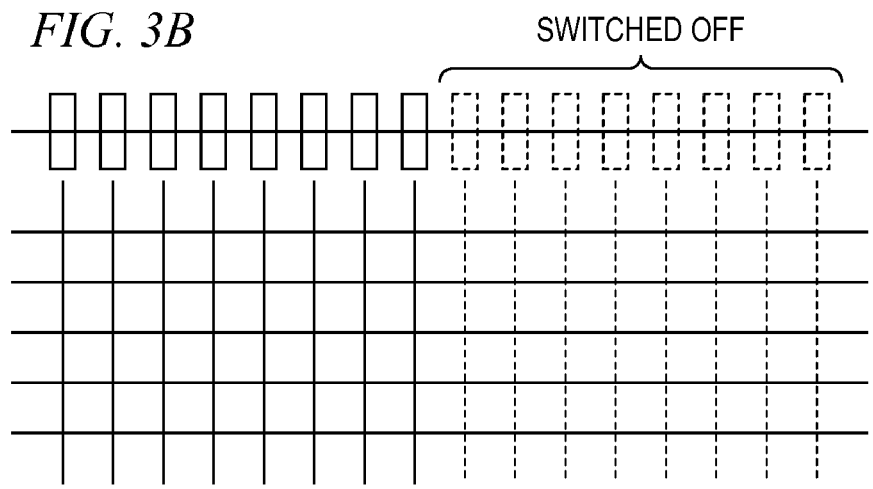
FIG. 3B illustrates an example DRAM array with unused columns switched off in accordance with an illustrative embodiment.

FIG. 3B illustrates an example DRAM array with unused columns switched off in accordance with an illustrative embodiment. Rows then become row segments. In this example, one column address bit is disabled, and the number of columns is cut in half. Each row is segmented into an active row segment and a disabled row segment. The DRAM device balances the overhead (area and power) introduced for additional logic that enables and manages the dynamic row width with the active and leakage power reduction that results from using smaller rows. Active power is smaller when using smaller row widths; however, the capacity of the device is also smaller. In this example, for unused columns, the sense amps and associated logic can be optionally power gated off to cut leakage or clock-gated to reduce switching energy.

The DRAM controller coordinates with higher-level memory management functions. Memory controller logic or system software can drive row width selection in conjunction with memory resizing operations. The hardware logic or memory management software may use data from low-level DRAM array usage monitoring as feedback to drive dynamic row width selection. Heavy sequential physical access favors wider row width. Limited row buffer locality favors smaller row width.

Figure 4A:
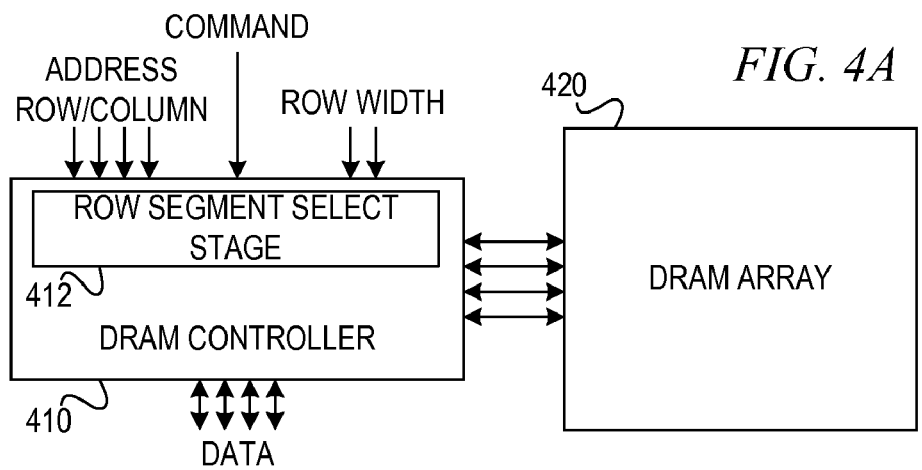
FIG. 4A is a block diagram of a DRAM device with dynamic row count adjustment in accordance with an illustrative embodiment.

In accordance with another illustrative embodiment, the DRAM device may perform dynamic row count adjustment, as will be described in further detail below. FIG. 4A is a block diagram of a DRAM device with a dynamic row count adjustment feature in accordance with an illustrative embodiment. A component, such as an application, operating system, or virtualization component, for example, may select DRAM row width at run time. Alternatively, the memory controller or other hardware mechanism may select a DRAM row width at run time. DRAM controller 410 may receive an explicit command to a latch row width using existing column address lines and/or a new DRAM command. DRAM controller 410 may comprise additional input lines to receive a row width. Selective enabling of column address lines can be an implicit indicator for row width selection.

DRAM controller 410 adjusts the number of active rows to treat unused columns as additional rows. Row segment select stage 412 performs dynamic row/column bit-line mapping. For example, disabling a column address line cuts the number of columns in half, effectively dividing each row into two row segments. In this embodiment, DRAM controller 410 may treat the unused row segments as additional rows in DRAM array 420. Thus, row segment select stage 412 may map the disabled column address line to a row address line, doubling the number of rows. As a further example, if the maximum row width is 8 k and the selected row width is 1 k, then the number of active rows may go from 16 k to 128 k, keeping the size of the array constant.

The effective set of row address bit lines grows as the effective set of column address bit lines shrinks. Device/array peripheral circuitry may increase the row address to support enough address lines to accommodate a maximum number of segmented rows. For example, if row width were reduced by a factor of $2^N$, then the device/array peripheral circuitry would support N additional address lines for row select compared to original maximum row width design.

In one embodiment, DRAM controller 410 comprises row segment select stage 412 in the addressing sequence to choose the segment within the maximum row size. Introduction of row segment select stage 412 may increase latency compared to the non-segmented DRAM design. The addition to the effective row address lines controls selection of the active sense amp/buffer width and appropriate row segment to transfer to/from the active sense amp region.

FIGS. 4B and 4C illustrate example DRAM arrays with row count adjustment in accordance with an illustrative embodiment. With reference to FIG. 4B, the row width is cut in half by reducing the column address by one bit and increasing the row address by one bit. The row width reduction results in each row being divided into two segments. The number of rows, R, is then doubled. Turning to FIG. 4C, the row width is divided by 4 by reducing the column address by 2 bits and increasing the row address by two bits. The row width reduction results in each row being divided into four row segments. The number of rows, R, is then multiplied by four.

There is some trade-off between increased area and power for the additional logic and the savings in power resulting from the smaller row width. Active power is smaller when using smaller row widths. Device capacity is dependent upon corresponding growth in row address lines. Unused columns in row array, sense amp, and associated logic can be optionally power gated off to cut leakage or clock-gated to reduce switching energy. Design elements supporting maintenance operations, such as refresh, can still be structured around the maximum row width organization to minimize their performance and power impact.

Memory controllers and system software can drive row width selection and row/column bit line mapping in conjunction with memory resizing operations. The memory management functions may use low-level array usage monitoring as feedback to drive dynamic row width selection and row/column bit line mapping. Heavy sequential physical access favors wider row width. Limited row buffer locality in accesses favors smaller row width.

FIG. 5A is a block diagram of a DRAM device with dynamic bank count adjustment in accordance with an illustrative embodiment. A component, such as an application, operating system, or virtualization component, for example, may select DRAM row width (active columns) at run time. The DRAM controller 510 or memory controller/hardware may dynamically synch on actual TOW width. DRAM controller 510 may receive an explicit command to latch row width using existing column address lines and/or new or existing command line. DRAM controller 510 may comprise additional input lines to receive a row width. Selective enabling of column address lines can be an implicit indicator for row width selection.

DRAM controller 510 may automatically or explicitly adjust the number of device banks to treat unused columns of a bank as forming one or more independent additional banks. DRAM controller 510 performs dynamic bank/column bit-line mapping. For example, if the maximum row width is 8 k, and the selected row width is 1 k, then the number of active banks can go up from 8 to 64, keeping the size of the DRAM array 520 constant.

The effective set of bank address bit lines grows as the effective set of column address bit lines shrinks. Device/array peripheral circuitry may increase the bank address to support enough bank address lines to accommodate a maximum number of banks. For example, if row width were reduced by a factor of $2^N$, then the device/array peripheral circuitry would support N additional address lines for bank select compared to original maximum row width design.

In one embodiment, DRAM controller 510 comprises sub bank segment select stage 512 in the DRAM addressing sequence to choose the bank segment within the maximum row size. Introduction of sub bank segment select stage 512 may increase latency compared to the non-segmented DRAM design. The addition to the effective bank address lines controls sub setting of the sense amp operations. The effective cache size in the form of row buffers is still maintained even as row width decreases. Dynamic row width selection with resizing the number of banks improves effective performance/bandwidth from the DRAM device.

FIG. 5B illustrates an example DRAM array with bank count adjustment in accordance with an illustrative embodiment. In the depicted example, the row width is cut in half by reducing the column address by one bit and increasing the bank select address by one bit. The row width reduction results in each row being divided into two segments. The number of banks is then doubled in the depicted example.

The DRAM device segments rows, and the number of supported segments, balancing the overhead (area and power) introduced for additional logic with the active and leakage power reduction with smaller rows. That is, there is some trade-off between increased area and power for the additional logic and the savings in power resulting from the smaller row width. Active power is smaller when using smaller row widths. Device capacity is dependent upon corresponding growth in bank address lines. Unused columns in row array, sense amp, and associated logic can be optionally power gated off to cut leakage or clock-gated to reduce switching energy. Design elements supporting maintenance operations, such as refresh, can still be structured around the maximum row width organization to minimize their performance and power impact.

Memory controllers and system software can drive row width selection and bank/column bit line mapping in conjunction with memory resizing operations. Relatively autonomous row width selection is possible at the memory controller level based on explicit memory sizing/resizing commands and initializations to the controller. The memory management functions may use low-level array usage monitoring as feedback to drive dynamic row width selection and bank/column bit line mapping. Heavy sequential physical access favors wider row width. Limited row buffer locality in accesses favors smaller row width. Random access patterns favor need to support higher number of banks with smaller, multiple row buffer caches.

Current DRAM designs incorporate optimizations to minimize the impact of refresh operations on normal memory operations. Wide row widths help to reduce this impact. In accordance with the illustrative embodiments, the refresh operations may continue to retain usage of the maximum row width select option, instead of refreshing by selected reduced row width, even as normal operations access arrays at smaller row widths.

As will be appreciated by one skilled in the art, the present invention may be embodied as a system, method, or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. A computer readable signal medium may be any computer readable medium that is not a computer readable storage medium and that can communicate, propagate, or transport a program for use by or in connection with an instruction execution system, apparatus, or device.

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions or hardware. These computer program instructions may be provided to a processor or controller of a memory device to produce a machine, such that the instructions, which execute via the processor or controller, create means for implementing the functions/acts specified in the flowchart and/or block diagram block or blocks.

FIG. 6 is a flowchart illustrating operation of a memory controller with dynamic row width selection in accordance with an illustrative embodiment. Operation begins, and the memory controller receives a row width selection command (block 602) and receives a row width (block 604). The memory controller segments rows in the memory array by disabling one or more column address bits (block 606). The memory controller then powers off the sense amps for unselected columns (block 608).

The memory controller determines whether a request to access the memory array is received (block 610). If an access is not received, operation returns to block 610 to determine whether an access request is received. If an access request is received in block 610, then the memory controller accesses the enabled columns (block 612). Thereafter, operation returns to block 610 to determine whether a memory access request is received. If the column address is to the disabled region, the memory request may be treated as an out-of-bounds access. Alternatively, column address bits associated with the disabled columns may simply be ignored.

FIG. 7 is a flowchart illustrating operation of a memory controller with dynamic row count adjustment in accordance with an illustrative embodiment. Operation begins, and the memory controller receives a row count adjustment command (block 702) and receives a row width (block 704). The memory controller configures the row and column addresses by decreasing the set of column address bits and decreasing the set of row address bits (block 706).

The memory controller determines whether a request to access the memory array is received (block 708). If an access is not received, operation returns to block 708 to determine whether an access request is received. If an access request is received in block 708, then the memory controller determines the column and row segment based on the address (block 710) and accesses the columns of the identified row segment (block 712). Thereafter, operation returns to block 708 to determine whether a memory access request is received.

FIG. 8 is a flowchart illustrating operation of a memory controller with dynamic bank count adjustment in accordance with an illustrative embodiment. Operation begins, and the memory controller receives a bank count adjustment command (block 802) and receives a row width (block 804). The memory controller segments the rows of the memory array into additional banks (block 806).

The memory controller determines whether a request to access the memory array is received (block 808). If an access is not received, operation returns to block 808 to determine whether an access request is received. If an access request is received in block 808, then the memory controller determines the column, row, and bank based on the address (block 810) and accesses the columns of the identified row segment and bank (block 812). Thereafter, operation returns to block 808 to determine whether a memory access request is received.

FIG. 9 is a flowchart illustrating operation of a mechanism for configuring a memory device with dynamic row width selection in accordance with an illustrative embodiment. The mechanism may be embodied within higher-level memory management functions within the memory controller, the operating system running on one or more processors, or a virtualization component running within the data processing system. Operation begins, and the mechanism monitors array usage (block 902). The mechanism determines a row width based on actual array usage (block 904). The mechanism then sends a row width to the DRAM controller (block 906).

The mechanism determines whether to activate dynamic row width selection based on low-level array usage monitoring (block 908). If the mechanism determines that memory array usage is such that a power savings can be achieved through row width selection, the mechanism sends a row width selection command to the DRAM controller (block 910). The row width selection command tells the DRAM controller to disable one or more column address lines and power gate off sense amp and associated logic or clock gate the sense amp and associated logic to reduce switching energy.

Thereafter, or if the mechanism determines not to activate row width selection in block 908, the mechanism determines whether to activate row count adjustment (block 912). If the mechanism determines that memory array usage is such that a power savings can be achieved through row width selection with row count adjustment, to reduce row width while keeping memory capacity constant, the mechanism sends a row count adjustment command to the DRAM controller (bock 914). The row count adjustment command tells the DRAM controller to perform row/column bit line mapping to reconfigure unused columns into additional rows.

Thereafter, or if the mechanism determines not to activate row count adjustment in block 912, the mechanism determines whether to activate bank count adjustment (block 916). If the mechanism determines that memory array usage is such that a power savings and improved performance/bandwidth can be achieved through bank count adjustment, then the mechanism sends a bank count adjustment command to the DRAM controller (block 918). The bank count adjustment command tells the DRAM controller to perform bank/column bit line mapping to reconfigure unused columns into additional banks. Thereafter, or if the mechanism determines not to activate bank count adjustment in block 916, operation returns to block 902 to monitor array usage.

The mechanism may select only one of dynamic row width selection, dynamic row width selection with row count adjustment, and dynamic row width selection with bank count adjustment. Alternatively, the mechanism may select a combination of the above row width selection options. For example, the mechanism may send both row width selection and row count adjustment command such that the number of column address lines is reduced by two, but the number of row address lines is increased by one. In this example, half of the sense amps will be power gated off, disabling half of the columns. The remaining row segments may be further segmented so that the number of rows is doubled. That is, the number of columns is divided by four, and the number of rows is doubled, resulting in a row width that is a quarter of the maximum row width but half the capacity rather than a quarter of the capacity. As another example, the mechanism may divide the number of columns by four, double the number of rows, and double the number of banks. Other combinations of row width selection options will become apparent to a person of ordinary skill in the art given the above description of the illustrative embodiments.

The flowchart and block diagrams in the figures illustrate the architecture, functionality, and operation of possible implementations of systems, methods and computer program products according to various embodiments of the present invention. In this regard, each block in the flowchart or block diagrams may represent hardware logic (e.g., state machines) or a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments may be utilized in many different types of data processing environments including a distributed data processing environment, a single data processing device, or the like. In order to provide a context for the description of the specific elements and functionality of the illustrative embodiments. FIG. 10 is provided hereafter as an example environment in which aspects of the illustrative embodiments may be implemented. While the description following FIG. 10 will focus primarily on a single data processing device implementation, this is only an example and is not intended to state or imply any limitation with regard to the features of the present invention. To the contrary, the illustrative embodiments are intended to include distributed data processing environments and embodiments.

FIG. 10 is a block diagram of an example data processing system in which aspects of the illustrative embodiments may be implemented. Data processing system 1000 is an example of a computer in which computer usable code or instructions may be located. In the depicted example, data processing system 1000 employs a hub architecture including north bridge and memory controller hub (NB/MCH) 1002 and south bridge and input/output (I/O) controller hub (SB/ICH) 1004. Processing unit 1006, main memory 1008, and graphics processor 1010 are connected to NB/MCH 1002. Graphics processor 1010 may be connected to NB/MCH 1002 through an accelerated graphics port (AGP). Main memory 1008 may be dynamic random access memory (DRAM) device, such as the DRAM devices in FIGS. 3A, 4A, and 5A.

In the depicted example, local area network (LAN) adapter 1012 connects to SB/ICH 1004. Audio adapter 1016, keyboard and mouse adapter 1020, modem 1022, read only memory (ROM) 1024, hard disk drive (HDD) 1026, CD-ROM drive 1030, universal serial bus (USB) ports and other communication ports 1032, and PCI/PCIe devices 1034 connect to SB/ICH 1004 through bus 1038 and bus 1040. PCI/PCIe devices may include, for example, Ethernet adapters, add-in cards, and PC cards for notebook computers. PCI uses a card bus controller, while PCIe does not. ROM 1024 may be, for example, a flash basic input/output system (BIOS).

HDD 1026 and CD-ROM drive 1030 connect to SB/ICH 1004 through bus 1040. HDD 1026 and CD-ROM drive 1030 may use, for example, an integrated drive electronics (IDE) or serial advanced technology attachment (SATA) interface. Super I/O (SIO) device 1036 may be connected to SB/ICH 1004.

An operating system runs on processing unit 1006. The operating system coordinates and provides control of various components within the data processing system 1000 in FIG. 10. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 1000 (Java is a trademark of Sun Microsystems, Inc. in the United States, other countries, or both).

As a server, data processing system 1000 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 1000 may be a symmetric multiprocessor (SMP) system including a plurality of processors in processing unit 1006. Alternatively, a single processor system may be employed.

Instructions for the operating system, the object-oriented programming system, and applications or programs are located on storage devices, such as HDD 1026, and may be loaded into main memory 1008 for execution by processing unit 1006. The processes for illustrative embodiments of the present invention may be performed by processing unit 1006 using computer usable program code, which may be located in a memory such as, for example, main memory 1008, ROM 1024, or in one or more peripheral devices 1026 and 1030, for example.

A bus system, such as bus 1038 or bus 1040 as shown in FIG. 10, may be comprised of one or more buses. Of course, the bus system may be implemented using any type of communication fabric or architecture that provides for a transfer of data between different components or devices attached to the fabric or architecture. A communication unit, such as modem 1022 or network adapter 1012 of FIG. 10, may include one or more devices used to transmit and receive data. A memory may be, for example, main memory 1008, ROM 1024, or a cache such as found in NB/MCH 1002 in FIG. 10.

Those of ordinary skill in the art will appreciate that the hardware in FIG. 10 may vary depending on the implementation. Other internal hardware or peripheral devices, such as flash memory, equivalent non-volatile memory, or optical disk drives and the like, may be used in addition to or in place of the hardware depicted in FIG. 10. Also, the processes of the illustrative embodiments may be applied to a multiprocessor data processing system, other than the SMP system mentioned previously, without departing from the spirit and scope of the present invention.

Moreover, the data processing system 1000 may take the form of any of a number of different data processing systems including client computing devices, server computing devices, a tablet computer, laptop computer, telephone or other communication device, a personal digital assistant (PDA), or the like. In some illustrative examples, data processing system 1000 may be a portable computing device which is configured with flash memory to provide non-volatile memory for storing operating system files and/or user-generated data, for example. Essentially, data processing system 1000 may be any known or later developed data processing system without architectural limitation.

Thus, the illustrative embodiments provide a mechanism for dynamic row-width memory. The memory adapts row width to usage based on memory controller and memory management system software control. The mechanism uses an organization and control of memory array access logic. The memory controller may receive an explicit command using existing column address lines or using a command line into the memory controller. In a first option, the memory controller receives a row width and disables the unused columns and turns off the unused sense amps. In a second option, the memory controller receives a row width and adjusts row count, keeping the number of active cells constant. In a third option, the memory controller receives a row width and adjusts a number of banks.

As noted above, it should be appreciated that the illustrative embodiments may take the form of an entirely hardware embodiment or an embodiment containing both hardware and software elements.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for dynamic row width selection in a memory array, the method comprising:
   receiving, by a memory controller, a row width selection command;
   disabling, by the memory controller, one or more column address lines; and
   disabling, by the memory controller, for each row of the memory array, a portion of a set of sense amps.

2. The method of claim 1,
   wherein disabling, for each row of the memory array, the portion of the set of sense amps comprises power gating off sense amps for unused columns.

3. The method of claim 2, wherein disabling, for each row of the memory array, the portion of the set of sense amps further comprises power gating off cells of the memory array for the unused columns.

4. The method of claim 2, further comprising:
   responsive to a memory access request comprising a column address and a row address, accessing enabled columns of the memory array corresponding to the column address.

5. The method of claim 1, further comprising:
   receiving a row count adjustment command,
   wherein disabling one or more column address lines comprises performing row/column address mapping to reduce a set of column address bit lines by a number of bits and increase a set of row address bit lines by the number of bits such that a number of rows in the memory array is increased by a factor of two to the number of bits thereby shifting column address bit lines to row address bit lines.

6. The method of claim 5, further comprising:
   responsive to receiving a memory access request comprising an address, identifying a column and row segment based on the address; and
   accessing the identified column and row segment in the memory array.

7. The method of claim 1, further comprising:
   receiving a bank count adjustment command, wherein disabling one or more column address lines comprises performing bank/column address mapping to reduce a set of column address bit lines by a number of bits and increase a set of bank address bit lines by the number of bits such that a number of banks in the memory array is increased by a factor of two to the number of bits thereby shifting column address bit lines to bank address bit lines.

8. The method of claim 7, further comprising:
responsive to receiving a memory access request comprising an address, identifying a column, row segment, and bank based on the address; and
accessing the identified column, row segment, and bank in the memory array.

9. The method of claim 1, wherein receiving a row width selection comprises receiving the row width selection on existing column address lines, wherein the existing column address lines are tri-stated to implicitly encode the row width.

10. A method, in a data processing system, for dynamic row width selection in a memory array, the method comprising:
monitoring usage of a memory array;
determining a row width based on the usage of the memory array;
sending a row width selection to a memory controller to select a row width for the memory array; and
disabling, by the memory controller, one or more column address lines based on the row width selection.

11. The method of claim 10, further comprising:
sending a command to the memory controller, wherein the command is selected based on the usage of the memory array.

12. The method of claim 11, wherein the command comprises at least one of a row width selection command, a row count adjustment command, or a bank count adjustment command.

13. A memory device, comprising:
a memory array; and
a memory controller, wherein the memory controller is configured to receive row width selection command, disable one or more column address lines, and disable, for each row of the memory array, a portion of a set of sense amps.

14. The memory device of claim 13, wherein
disabling, for each row of the memory array, the portion of the set of sense amps comprises power gating off sense amps for unused columns and power gating off cells of the memory array for the unused columns.

15. The memory device of claim 14, wherein the memory controller is further configured to:
responsive to a memory access request comprising a column address and a row address, access enabled columns of the memory array corresponding to the column address.

16. The memory device of claim 13, wherein the memory controller is further configured to:
receive a row count adjustment command,
wherein disabling one or more column address lines comprises performing row/column address mapping to reduce a set of column address bit lines by a number of bits and increase a set of row address bit lines by the number of bits such that a number of rows in the memory array is increased by a factor of two to the number of bits thereby shifting column address bit lines to row address bit lines.

17. The memory device of claim 16, wherein the memory controller is further configured to:
responsive to receiving a memory access request comprising an address, identify a column and row segment based on the address; and
access the identified column and row segment in the memory array.

18. The memory device of claim 13, wherein the memory controller is further configured to:
receive a bank count adjustment command,
wherein disabling one or more column address lines comprises performing bank/column address mapping to reduce a set of column address bit lines by a number of bits and increase a set of bank address bit lines by the number of bits such that a number of banks in the memory array is increased by a factor of two to the number of bits thereby shifting column address bit lines to bank address bit lines.

19. The memory device of claim 18, wherein the memory controller is further configured to:
responsive to receiving a memory access request comprising an address, identify a column, row segment, and bank based on the address; and
access the identified column, row segment, and bank in the memory array.

20. The memory device of claim 13, wherein receiving a row width selection comprises receiving the row width selection on existing column address lines, wherein the existing column address lines are tri-stated to implicitly encode the row width.

* * * * *